US011507377B2

(12) United States Patent
 Okazaki (10) Patent No.: US 11,507,377 B2
(45) Date of Patent: Nov. 22, 2022

(54) ARITHMETIC PROCESSING CIRCUIT AND ARITHMETIC PROCESSING METHOD

(71) Applicant: FUJITSU LIMITED, Kawasaki (JP)

(72) Inventor: Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/449,957

(22) Filed: Oct. 5, 2021

(65) Prior Publication Data
 US 2022/0188118 A1   Jun. 16, 2022

(30) Foreign Application Priority Data

Dec. 15, 2020   (JP) .............................. JP2020-207435

(51) Int. Cl.
 *G06F 9/38*   (2018.01)
 *G06F 9/30*   (2018.01)

(52) U.S. Cl.
 CPC .......... *G06F 9/3802* (2013.01); *G06F 9/3001* (2013.01)

(58) Field of Classification Search
 None
 See application file for complete search history.

(56) References Cited

U.S. PATENT DOCUMENTS

| | | | | |
|---|---|---|---|---|
| 6,256,709 B1 * | 7/2001 | Patel | ................... | G06F 12/0864 365/49.1 |
| 7,831,817 B2 * | 11/2010 | Biles | ..................... | G06F 9/3848 712/240 |
| 2006/0095745 A1 * | 5/2006 | Tran | ...................... | G06F 9/3826 712/E9.046 |
| 2006/0174096 A1 * | 8/2006 | Konigsburg | .......... | G06F 9/3806 712/238 |
| 2011/0320791 A1 * | 12/2011 | Prasky | .................. | G06F 9/3017 712/240 |
| 2015/0268957 A1 * | 9/2015 | Bonanno | ............... | G06F 9/3861 712/239 |
| 2015/0268958 A1 | 9/2015 | Al Sheikh et al. | | |
| 2016/0321077 A1 * | 11/2016 | Abdallah | ............ | G06F 12/0895 |
| 2018/0101385 A1 * | 4/2018 | Wang | .................. | G06F 12/0875 |

FOREIGN PATENT DOCUMENTS

| | | |
|---|---|---|
| JP | H05-143334 A | 6/1993 |
| JP | 2017-509995 A | 4/2017 |
| JP | 2018-063684 A | 4/2018 |
| WO | 2015/148372 A1 | 10/2015 |

* cited by examiner

*Primary Examiner* — Eric Coleman

(74) *Attorney, Agent, or Firm* — Fujitsu Patent Center (57) ABSTRACT

An arithmetic processing circuit includes an fetch unit configured to generate fetch addresses, an address table configured to store a branch address and a first tag for each of a plurality of indexes, the indexes being a first bit string extracted from a fetch address by including at least one bit among instruction address bits whose values vary within one fetch line, the first tag being a second bit string situated at higher bit positions than the first bit string, an upper tag storage unit configured to store a second tag situated at higher bit positions than the first tag, and a branch determination unit configured to supply to the fetch unit the branch address retrieved from the address table, upon determining that the first tag retrieved from the address table and the second tag in the upper tag storage unit match respective portions of the fetch address.

6 Claims, 9 Drawing Sheets

ARITHMETIC PROCESSING CIRCUIT AND ARITHMETIC PROCESSING METHOD

CROSS-REFERENCE TO RELATED APPLICATIONS

The present application is based upon and claims the benefit of priority from the prior Japanese Patent Application No. 2020-207435 filed on Dec. 15, 2020, with the Japanese Patent Office, the entire contents of which are incorporated herein by reference.

FIELD

The disclosures herein relate to arithmetic processing circuits and arithmetic processing methods.

BACKGROUND

With respect to a branch instruction to be executed, a branch prediction technique, which is one of the techniques for enhancing processor speed, predicts a branch direction indicative of whether the branch is taken or not taken, and also predicts the target address of the branch instruction (i.e., branch destination address). With this arrangement, subsequent instructions can be speculatively executed according to a prediction outcome before whether the branch is taken is determined at the time of execution of the branch instruction.

When the branch prediction is wrong, all the speculatively executed subsequent instructions are discarded, and execution needs to start over with correct subsequent instructions, which results in reduction in processor performance. Avoiding reduction in processor performance by improving the accuracy of branch prediction involves performing complex, computationally intensive arithmetic for branch prediction. As a result, latency longer than one-cycle latency ends up being needed to complete a branch prediction.

With long latency for branch prediction, however, an instruction fetch sequence may have a gap created therein, which gives rise to the problem of failing to maintain a sufficient throughput. For example, the branch prediction latency may be three cycles. Branch prediction for a first instruction is performed while performing instruction fetches in a sequential direction (i.e., instruction fetches by constant address increments) in successive cycles following the fetching of the first instruction. The outcome of branch prediction for the first instruction is obtained after the fetching of a third instruction (i.e., after the completion of three cycles). When the outcome of branch prediction indicates "branch taken", the second instruction and the third instruction which have been fetched in the sequential direction are canceled, and a new instruction fetch is started with respect to the target address indicated by the branch prediction outcome. In this case, the throughput drops in accordance with the length of branch prediction latency.

RELATED-ART DOCUMENTS

Patent Document

[Patent Document 1] Japanese Laid-open Patent Publication No. 2018-063684
[Patent Document 2] Japanese Laid-open Patent Publication No. H05-143334
[Patent Document 3] Japanese National Publication of International Patent Application No. 2017-509995

SUMMARY

According to an aspect of the embodiment, an arithmetic processing circuit includes an instruction fetch address generating unit configured to generate fetch addresses successively such that a plurality of instructions are included in one fetch line, an address table configured to store a branch destination address and a first tag for each of a plurality of indexes, the indexes being defined as a first bit string that is extracted from a fetch address by including at least one bit among instruction address bits whose values vary within the one fetch line, the first tag being a second bit string situated at higher bit positions than the first bit string in the fetch address, an upper tag storage unit configured to store a second tag, which is a third bit string situated at higher bit positions than the first tag among a plurality of bits constituting the fetch address, and a branch direction determination unit configured to supply to the instruction fetch address generating unit the branch destination address retrieved from the address table in response to the fetch address, upon determining that the first tag retrieved from the address table in response to the fetch address and the second tag stored in the upper tag storage unit match respective portions of the fetch address.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

A branch prediction mechanism is generally provided with a table for storing target addresses for respective ways and a table for predicting a branch direction. Prediction is then typically performed by referring to these tables by use of a portion (i.e., index) of a fetch address. Performing prediction by using a table having a plurality of ways, however, involves referring to all the ways in parallel by use of an index, checking whether a hit occurs with respect to these ways, and selecting one way when two or more ways provide a hit. Performing these functions requires an increase in the number of logic stages in logic circuits, thereby resulting in a long latency. Further, an attempt to shorten the latency makes it difficult to keep a high operating clock frequency.

The fact that the number of ways is large leads to an increase in the number of logic stages. By making the number of ways equal to one, it is possible to implement high-speed branch prediction with one-cycle latency from the viewpoint of the number of logic stages necessary for branch prediction. When the number of ways is simply made equal to one, however, the problem of table entry collision occurs as will be described below.

In general, one fetch line retrieved by one fetch address contains multiple (e.g., eight) instructions, and branch prediction is collectively performed with respect to these instructions. For example, one fetch line may contain eight instructions each having a length of four bytes, and two instructions among these eight instructions may be branch instructions. With a fetch address being 0x1000, the addresses of the first instruction through the eighth instruction contained in the fetch line are 0x1000, 0x1004, 0x1008, 0x100C, 0x1010, 0x1014, 0x1018, and 0x101C, respectively.

A branch prediction mechanism using a plurality of ways uses the index that increases by an increment of one each time the fetch address increases in the sequential direction by a predetermined constant increment. In the specific example noted above, bit5 through bit8 (hereinafter referred to as bit[8:5]) situated above the lower five bits (bit0 through bit4) are used as an index, for example. The index bit [8:5] for the fetch address 0x1000 is "0000", and the index bit[8:5] for the next fetch address 0x1100 in the sequential direction is "0001".

Even when the fetch line for the fetch address 0x1000 contains two branch instructions as in the above-noted example, use of a table containing a plurality of ways causes the two branch instructions to be stored in the table and assigned to respective, different ways. The plural ways at the index "0000" are referred to in parallel, so that a branch prediction outcome is obtained for each of the two respective branch instructions.

If the number of ways is made equal to one, however, there will be only one entry for the index "0000" in the table. As a result, one of the two branch instructions contained in the fetch line cannot be stored in the table, so that prediction cannot be performed with respect to this instruction with one-cycle latency. In embodiments described in the following, provision is made to solve the problem noted above such that at least two indexes are assigned to one fetch line when a portion of a fetch address is used as an index for branch prediction.

In the following, embodiments of the invention will be described with reference to the accompanying drawings. In these drawings, the same or corresponding elements are referred to by the same or corresponding numerals, and a description thereof will be omitted as appropriate.

Figure 1:
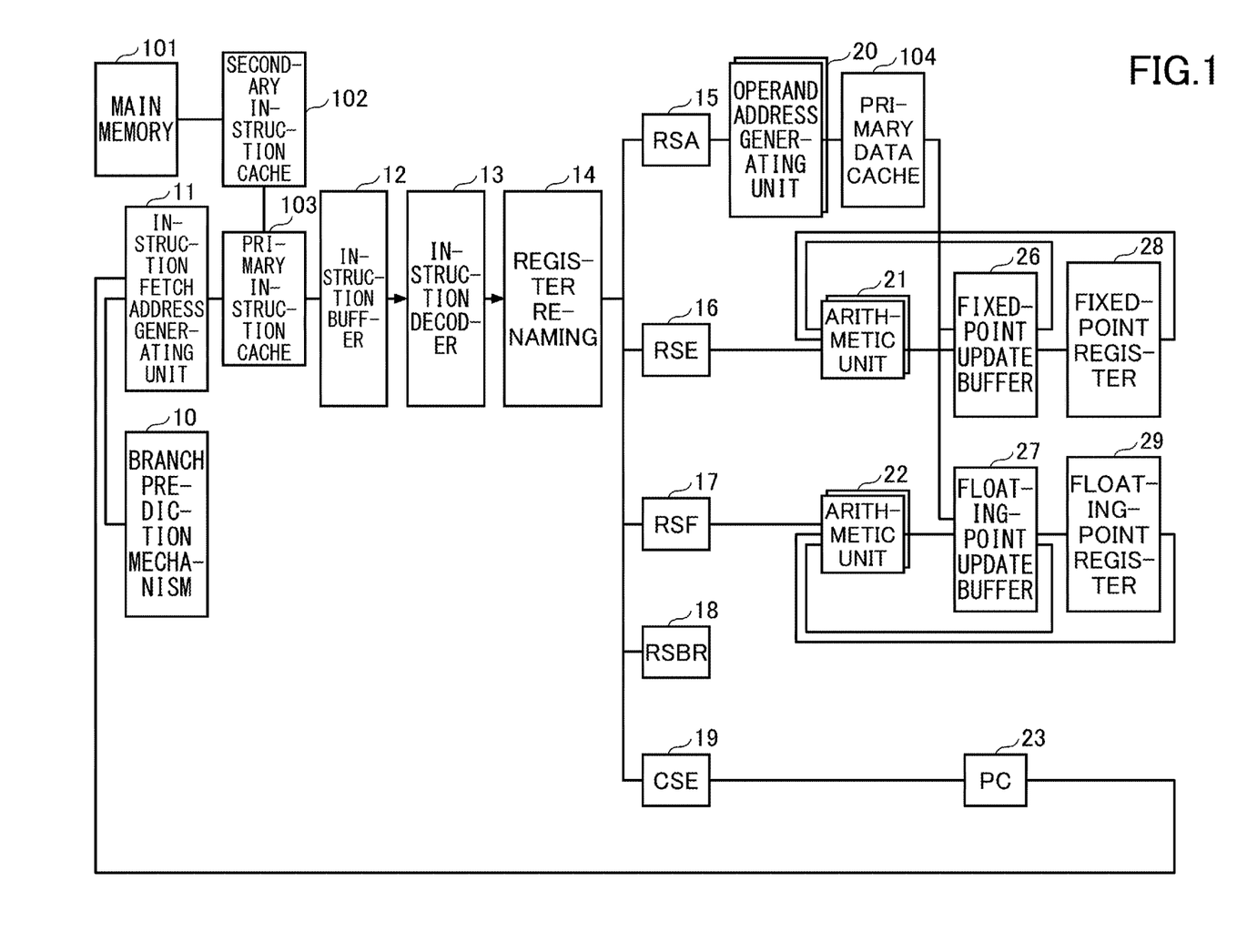
FIG. 1 is a drawing illustrating an example of the configuration of a processor.

FIG. 1 is a drawing illustrating an example of the configuration of a processor. In FIG. 1 and the subsequent similar drawings, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The processor illustrated in FIG. 1 includes a branch prediction mechanism 10, an instruction fetch address generating unit 11, an instruction buffer 12, an instruction decoder 13, and a register renaming 14. The processor further includes an RSA (Reservation Station for Address Generate) 15, an RSE (Reservation Station for Execute) 16, an RSF (Reservation Station for Floating) 17, and an RSBR (Reservation Station for Branch) 18. The processor further includes a CSE (Commit Stack Entry) 19, an operand address generating unit 20, an arithmetic unit 21, an arithmetic unit 22, and a next program counter (PC) 23. The processor further includes a fixed-point update buffer 26, a floating-point update buffer 27, a fixed-point register 28, and a floating-point register 29. The processor may further include a secondary instruction cache 102, a primary instruction cache 103, and a primary data cache 104. Some of these caches may be provided outside the processor. The secondary instruction cache 102 is connected to a main memory 101.

The instruction fetch address generating unit 11 includes a program counter for storing an instruction fetch address, and successively generates instruction fetch addresses by increasing the stored value of the program counter by a constant increment. One fetch line retrieved by one fetch address may contain multiple (e.g., eight) instructions. The number of instructions included in a fetch line is not limited to a particular number.

The branch prediction mechanism 10 receives an instruction fetch address output from the instruction fetch address generating unit 11 to perform branch prediction concurrently with instruction fetch. The branch prediction mechanism 10 performs branch prediction based on the received instruction fetch address, and returns the branch destination address (target address) and the branch direction indicative of either "branch taken" or "branch not taken" to the instruction fetch address generating unit 11. If the branch prediction is "branch taken", the instruction fetch address generating unit 11 selects the branch destination address predicted by the branch prediction mechanism 10 as the next instruction fetch address. The configuration and operation of the branch prediction mechanism 10 will be described later.

The instruction fetch address generating unit 11 issues an instruction fetch address and an instruction fetch request to the primary instruction cache 103. In response, one or instructions of the fetch line corresponding to the instruction fetch address are read from the primary instruction cache 103, and are stored in the instruction buffer 12.

The instruction buffer 12 supplies the stored instructions to the instruction decoder 13 in the order of executions in the program, i.e., in the "in-order" sequence. The instruction decoder 13 decodes the instructions in the order of execution in the program, i.e., in the in-order sequence, followed by issuing instructions in the in-order sequence. The register renaming 14 dynamically changes correspondences between registers indicated in instructions and physical registers, thereby increasing the efficiency of parallel execution. Based on these instruction issuance process and register renaming process, an entry indicating each instruction is created according to the type of decoded instruction in the RSA 15, the RSE 16, the RSF 17, or the RSBR 18, each of which is a queue-structure storage.

The RSA 15 is a reservation station that controls the created entries, in an out-of-order sequence without being restricted by the order of instructions in the program, in order to generate a main memory operand address for executing load or store instructions. Based on the control by the RSA 15, the operand address generating unit 20 generates an access address, so that a load instruction or store instruction is executed with respect to this address in the primary data cache 104. Data read by the load instruction is stored in a designated register in the fixed-point update buffer 26 or in the floating-point update buffer 27.

The RSE 16 is an reservation station that controls the created entries in an out-of-order sequence to perform a specified fixed-point arithmetic operation with respect to data in a specified register. The RSE 16 checks dependencies between the registers accessed by instructions to be executed, and determines whether the arithmetic unit 21 serving as execution resources can execute an instruction, based on the update status of registers having dependencies and the execution status of instructions using the same execution resources of the arithmetic unit 21. If executable, the RSE 16 outputs information necessary for executing instructions, such as register numbers and operand addresses, to each arithmetic unit 21 in an out-of-order sequence, without regard to the order in which the instructions are received. Based on the control by the RSE 16, the arithmetic unit 21 performs a specified fixed-point arithmetic operation with respect to data in specified registers in the fixed-point update buffer 26 and the fixed-point register 28, followed by storing the result of arithmetic operation in a designated register in the fixed-point update buffer 26.

The RSF 17 is an reservation station that controls the created entries in an out-of-order sequence to perform a specified floating-point arithmetic operation with respect to data in a specified register. The RSF 17 outputs information necessary for executing instructions such as register numbers and operand addresses to each arithmetic unit 22 in an out-of-order sequence in the same or similar manner as in the case of the RSE 16 described above. Based on the control by the RSF 17, the arithmetic unit 22 performs a specified floating-point arithmetic operation with respect to data in specified registers in the floating-point update buffer 27 and the floating-point register 29, followed by storing the result of arithmetic operation in a designated register in the floating-point update buffer 27.

The RSBR 18 is a reservation station for executing branch instructions. The RSBR 18 receives data indicative of the types of branch instructions from the instruction decoder 13, and also receives the branch instruction addresses from the instruction address buffer, followed by storing these data for respective branch instructions. Subsequently, the RSBR 18 receives from the arithmetic unit 21 the results of arithmetic operations that are to serve as branch destination addresses and branch conditions. The RSBR 18 determines that the branch is taken if the obtained arithmetic results satisfy branch conditions, and determines that the branch is not taken if the obtained arithmetic results do not satisfy branch conditions, thereby making a determination on the branch direction.

The RSBR 18 also determines whether the actual branch address and branch direction indicated by the results of the above-noted arithmetic operations match the branch address and the branch direction determined at the time of branch prediction, and also controls the order in which branch instructions are executed. The RSBR 18, which registers the branch direction and the branch destination address determined at the time of branch prediction when an entry is created, checks a match between the arithmetic operation results and the prediction, followed by replacing the entry based on the arithmetic operation results. Specifically, the RSBR 18 receives data indicative of the types of branch instruction from the instruction decoder 13, and also receives the branch instruction addresses, followed by storing these data for respective branch instructions.

When the result of actual execution of a branch instruction matches the branch prediction result, the RSBR 18 supplies information on the completed branch instruction to the branch prediction mechanism 10 while outputting a branch instruction completion notice to the CSE 19. When the result of actual execution of a branch instruction does not match the branch prediction result, the RSBR 18 outputs a branch instruction completion notice and a request to cancel subsequent instructions to the CSE 19. When the result of actual execution of the branch instruction does not match the branch prediction result, the RSBR 18 also outputs an instruction re-fetch request and an instruction re-fetch address to the instruction fetch address generating unit 11, together with supplying information on the completed branch instruction to the branch prediction mechanism 10.

The instruction decoder 13 also assigns instruction identifiers to all decoded instructions, and sends the instruction identifiers to the CSE 19 in the order of instructions. The CSE 19 includes a queue structure storage and a completion processing circuit. The queue structure storage stores the instruction identifiers of decoded instructions in the order in which the instructions are executed. The completion processing circuit performs a commit process based on information about the queue and an operation completion notice sent from each processing pipe. The instruction identifier of an instruction decoded by the decoder is stored in the queue in the CSE 19, waiting for a completion notice from the processing pipes. When a reservation station sends to the CSE 19 a completion notice regarding an instruction executed in an out-of-order sequence, the completion processing circuit of the CSE 19 releases, in the in-order sequence, the instruction corresponding to the completion notice among the instructions waiting for completion in the queue, thereby finalizing the completion.

Resources are updated with respect to the instruction that is released from the CSE 19 and whose completion is finalized. In the case of a load instruction or an arithmetic instruction, data in the fixed-point update buffer 26 or in the floating-point update buffer 27 is transferred to the fixed-point register 28 or to the floating-point register 29, which causes the results of executing the instruction to be reflected in a register that is accessible from software. At the same time, the value of the next program counter 23 is increased by an appropriate increment to point to the address of an instruction next following the instruction that is completed and released. The next program counter 23 is a program counter used in special cases such as when an interrupt occurs, and is not used during the orderly running of programs.

Figure 2:
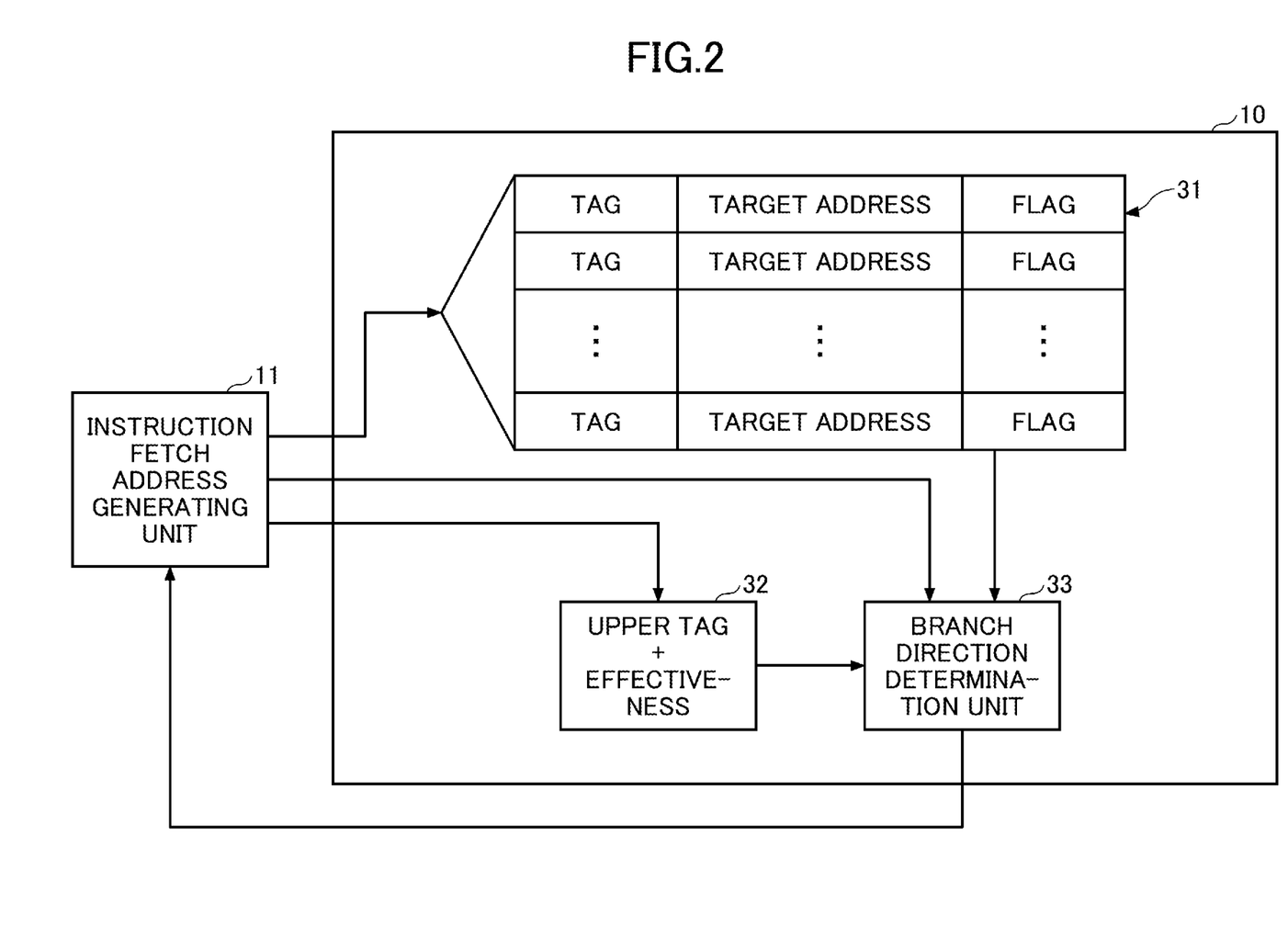
FIG. 2 is a drawing illustrating an example of the configuration of a branch prediction mechanism according to a first embodiment.

FIG. 2 is a drawing illustrating an example of the configuration of the branch prediction mechanism 10 according to the first embodiment. The branch prediction mechanism 10 illustrated in FIG. 2 includes an address table 31, an upper tag storage unit 32, and a branch direction determination unit 33.

The instruction fetch address generating unit 11 illustrated in FIG. 2 is the instruction fetch address generating unit 11 illustrated in FIG. 1, and successively generates fetch addresses such that one fetch line includes a plurality of instructions. Among the fetch addresses successively generated by the instruction fetch address generating unit 11 in the sequential direction, a given fetch address and the immediately following fetch address have a difference therebetween that is a predetermined constant value (e.g., 32 bytes). In this case, the length of one fetch line is equal to this difference (e.g., 32 bytes). One fetch line having a length of 32 bytes may contain eight instructions each having a length of four bytes, for example. The following description uses an example in which the length of a fetch line is 32 bytes, and includes eight instructions each four bytes long. It may be noted that this example is in no way intended to be limiting.

The address table 31 stores an entry for each of a plurality of indexes, the indexes being defined as a bit string that is extracted from a fetch address by including at least one bit among instruction address bits whose values vary within one fetch line. The entry for each index includes a branch destination address, a first tag that is a bit string situated at higher bit positions in a fetch address than the bit string of the indexes, and a flag indicative of whether the entries are valid.

The index of the address table 31 is, for example, bit[6:3] (bit3 to bit6) located above the lower three bits (bit0 to bit2) in a fetch address when the fetch line is 32 bytes long. The first tag stored in the address table 31 is a bit string situated at higher bit positions than the index, and may be bit[10:7] (bit7 to bit10), for example.

The address table 31 outputs the entry corresponding to a fetch address generated by the instruction fetch address generating unit 11. Specifically, as bit[6:3] of a fetch address is supplied to the address table 31 from the instruction fetch address generating unit 11, the address table 31 outputs one target address, one first tag, and one flag corresponding to this index. The output target address, first tag, and flag are supplied to the branch direction determination unit 33.

The upper tag storage unit 32 stores one second tag, which is a bit string comprised of higher-order bits than the first tag among a plurality of bits constituting a fetch address. In this example, bit[15:11], which are higher-order bits than the first tag bit[10:7], may be the second tag, for example. The second tag bit[15:11] is used in the case in which the address bits are 16 bits. In the case in which the address bits are 32 bits, the second tag may be bit[31:11], for example.

When bit [15:11] of a fetch address is supplied from the instruction fetch address generating unit 11 to the upper tag storage unit 32, the upper tag storage unit 32 may compare the second tag stored therein with bit [15:11] supplied thereto, followed by outputting a signal indicating the result of comparison. The signal indicative of the result of comparison is supplied to the branch direction determination unit 33. Alternatively, the upper tag storage unit 32 may supply the second tag to the branch direction determination unit 33, and the branch direction determination unit 33 may compare bit[15:11] of the fetch address supplied from the instruction fetch address generating unit 11 with the second tag supplied from the upper tag storage unit 32.

The branch direction determination unit 33 receives the portion (i.e., bit [10:7]) of the fetch address that corresponds to a first tag from the instruction fetch address generating unit 11. The branch direction determination unit 33 determines whether the first tag retrieved from the address table 31 in response to the fetch address and the second tag stored in the upper tag storage unit 32 match the respective portions of the fetch address. The branch direction determination unit 33 supplies a target address retrieved from the address table 31 in response to the fetch address to the instruction fetch address generating unit 11 when the results of determination indicate matches. Namely, the branch prediction mechanism 10 predicts "branch taken" as the outcome of branch prediction calculation, followed by supplying the target address to the instruction fetch address generating unit 11.

Even when the results of determination indicate matches, the branch direction determination unit 33 does not supply the target address to the instruction fetch address generating unit 11 if a flag retrieved from the address table 31 in response to the fetch address indicates invalid. The flag is 1-bit data indicating whether the entry in the address table 31 is valid or invalid. When the flag indicates invalid, it is not appropriate to use the entry stored in the address table 31 for the branch prediction.

In may happen that the outcome of actual execution of a branch instruction does not match the outcome of branch prediction. In such a case, the entry of the address table 31 may be updated based on information about the completed branch instruction supplied from the RSBR 18 illustrated in FIG. 1, for example. For example, information from the RSBR 18 may indicate "branch taken" for the fetch line for which prediction was "branch not taken". In this case and the like, the entry (i.e., a target address and the like) at the corresponding index in the address table 31 may be newly registered, for example. Information from the RSBR 18 may indicate "branch not taken" for the fetch line for which prediction was "branch taken". In this case and the like, the flag at the corresponding index in the address table 31 may be reset (i.e., set to an invalid state), for example.

The upper tag storage unit 32 is provided with a saturation counter that indicates the effectiveness of a second tag stored therein. Information about a completed branch instruction from the RSBR 18 may indicate that the instruction for which branch was taken is that of an instruction address corresponding to the second tag, in which case the saturation counter may be increased by one. At this time, a saturation counter value that has already reached an upper limit value is not increased by one, and is maintained at the upper limit value. Information about a completed branch instruction from the RSBR 18 may indicate that the instruction for which branch was taken is that of an instruction address that does not correspond to the second tag, in which case the saturation counter may be decreased by one. Information about a completed branch instruction from the RSBR 18 may indicate that the instruction for which branch was taken is that of an instruction address that does not correspond to the second tag, and, also, the saturation counter value may be equal to a lower limit value. In such a case, the second tag may be updated in accordance with the instruction address of the completed branch instruction. Together with this updating, the saturation counter indicative of effectiveness may be set to the upper limit value, and all the flags in the address table 31 may be reset.

In the branch prediction mechanism 10 configured as described above, the number of ways in the address table 31 is set to one, which eliminates the need for the process of selecting a way when a hit occurs in two or more ways. It is thus possible to reduce the number of logic stages of the process performed for branch prediction, thereby enabling high-speed branch prediction.

In the branch prediction mechanism 10, the index of the address table 31 is 4 bits long, for example, so that the number of entries in the address table 31 becomes 16. Use of a small number of entries such as 16 makes it possible that the arithmetic logic operation for retrieving an entry from the address table 31 in response to an index is implemented as a small number of logic stages. This arrangement enables the realization of high-speed reading from the address table 31.

In the branch prediction mechanism 10, a higher-order-bit portion of the bit string suitable as tag information is stored in the upper tag storage unit 32 as the second tag, and there is only one such a second tag provided in the entire branch prediction mechanism 10. Instead of using such a configuration, the tag stored in the address table 31 may be configured to have an increased number of bits, in which case, however, the number of logic stages of the circuit necessary in the branch direction determination unit 33 to find a match for a tag retrieved from the address table 31 ends up having an increased number of logic stages. The instruction sequence subject to the branch prediction mechanism 10 illustrated in FIG. 2 is supposed to be a sequence of instructions within a relatively narrow range address space, and, thus, changes in the high-order bits are small. In consideration of this, a higher-order-bit portion of the bit string suitable as tag information is stored in the upper tag storage unit 32 as the second tag, and providing only one such a second tag in the entire branch prediction mechanism 10 is sufficient. With this arrangement, the entry corresponding to an index is retrieved from the address table 31, and, concurrently in parallel therewith, the second tag stored in the upper tag storage unit 32 is checked for matching, which serves to shorten the time length required for tag matching.

The configuration of the branch prediction mechanism 10 noted above enables the shortening of a time length for branch prediction, and makes it possible to complete branch prediction calculation within one-cycle latency. This specifically means the following. The instruction fetch address generating unit 11 successively generates fetch addresses in synchronization with a predetermined clock signal. The situation may be such that the branch direction determination unit 33 predicts "branch taken" in response to a first fetch address generated in the first clock cycle of the clock signal, and supplies a first branch destination address to the instruction fetch address generating unit 11. In this case, the instruction fetch address generating unit 11 generates the first branch destination address as a fetch address in the second clock cycle of the clock signal following the first clock cycle. Namely, based on the outcome of branch prediction for the fetch address generated in the first clock cycle, the instruction fetch address generating unit 11 can generate a fetch address in the immediately following second clock cycle.

Completing branch prediction within one-cycle latency eliminates the need to cancel a fetched instruction when the outcome of branch prediction indicates "branch taken", thereby enabling the realization of an efficient fetch operation. Namely, high throughput unaffected by the outcome of branch prediction can be preserved.

Figure 3:
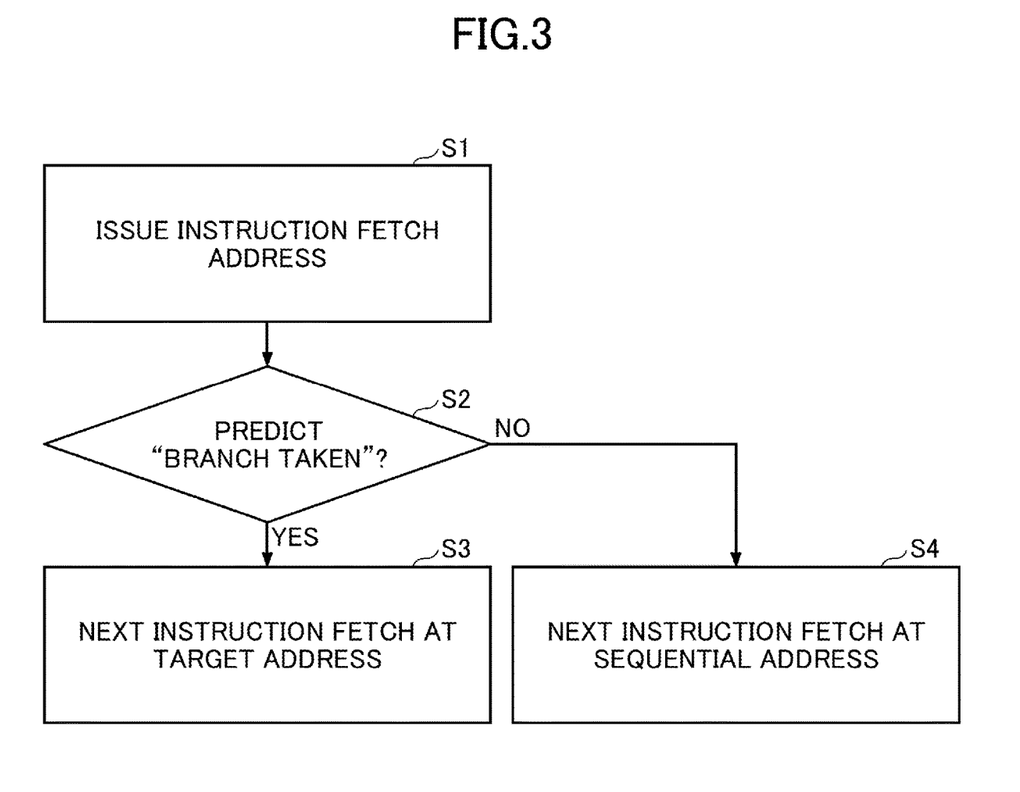
FIG. 3 is a flowchart showing the functioning of a branch prediction mechanism and an instruction fetch address generating unit illustrated in FIG. 2.

FIG. 3 is a flowchart showing the functioning of the branch prediction mechanism 10 and the instruction fetch address generating unit 11 illustrated in FIG. 2. It may be noted that, in FIG. 3 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S1, the instruction fetch address generating unit 11 notifies the branch prediction mechanism 10 of a fetch address. Specifically, bit[6:3] of the fetch address is supplied to the address table 31, and bit[10:7] of the fetch address is supplied to the branch direction determination unit 33, with bit[15:11] of the fetch address being supplied to the upper tag storage unit 32.

When the branch prediction mechanism 10 indicates "branch taken" (YES) in step S2, the instruction fetch address generating unit 11 in step S3 performs a next instruction fetch by using a target address supplied from the branch prediction mechanism 10. When the branch prediction mechanism 10 does not indicate "branch taken" (NO) in step S2, the instruction fetch address generating unit 11 does not receive a target address, and performs in step S4 an instruction fetch by using the next instruction address in the sequential direction.

Figure 4:
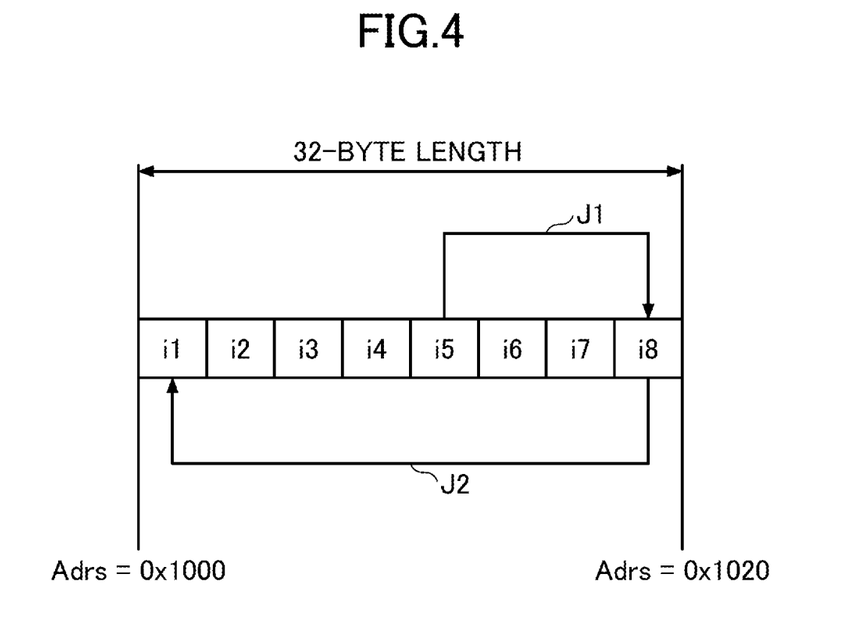
FIG. 4 is a drawing illustrating an example of the configuration of a fetch line.

FIG. 4 is a drawing illustrating an example of the configuration of a fetch line. An entry registration in the address table 31 illustrated in FIG. 2 will be described with reference to FIG. 4.

In FIG. 4, one fetch line having a length of 32 bytes includes eight instructions i1 through i8, each of which is 4 bytes in length. The fetch address for fetching this fetch line is 0x1000. The addresses of the instructions i1 through i8 contained in the fetch line are 0x1000, 0x1004, 0x1008, 0x100C, 0x1010, 0x1014, 0x1018, and 0x101C, respectively.

In the example illustrated in FIG. 4, two instructions i5 and i8 among the eight instructions i1 through i8 are branch instructions. The branch destination of the instruction i5 is the address of the instruction i8 as indicated by an arrow J1 in FIG. 4. The branch destination of the instruction i8 is the address of the instruction i1 as indicated by an arrow J2.

The instruction fetch address generating unit 11 fetches the fetch line illustrated in FIG. 4 at the fetch address 0x1000, and, also, supplies the fetch address 0x1000 to the branch prediction mechanism 10 to let branch prediction calculation be performed. The branch prediction mechanism 10 is expected to respond to the fetch address 0x1000 by performing branch prediction with respect to the instruction i5 that is the first branch instruction in the sequential direction among the instructions i1 through i8. Since bit[6:3], i.e., the index portion, of the fetch address 0x1000 is "0000", an entry for the instruction i5 is stored at the position of index "0000" in the address table 31. For example, an entry for the instruction i5 may be created in the address table 31 based on information about a completed branch instruction i5 supplied from the RSBR 18 illustrated in FIG. 1.

It may be noted that bit [6:3] of the address 0x1010 of the instruction i5 is "0010". However, since branch prediction for the instruction i5 is expected to be performed in response to the fetch address 0x1000, provision is made such that an entry for the instruction i5 is stored at the position of index "0000" as described above.

Branch prediction calculation is performed for the instruction i8 when the outcome of branch prediction for the instruction i5 indicates "branch taken" to cause the instruction fetch address generating unit 11 to fetch an instruction at the target address equal to the address of the instruction i8. Since bit[6:3], i.e., the index portion, of the address 0x101C of the instruction i8 is "0011", an entry for the instruction i8 is stored at the position of index "0011" in the address table 31. For example, an entry for the instruction i8 may be created in the address table 31 based on information about a completed branch instruction i8 supplied from the RSBR 18 illustrated in FIG. 1.

In the address table 31 illustrated in FIG. 2, only one tag is provided for each index, and the number of ways is 1. Despite the fact that the number of ways is 1, the address table 31 can register entries for two or more instructions included in one fetch line. This is because the index is defined as a bit string that is selected to include at least one bit among instruction address bits whose values vary within one fetch line.

For example, bit[5:2] of an instruction address may alternatively be used as the index. In this case, instruction addresses at which the eight instructions contained in one fetch line are stored have different bit patterns in bit[5:2] from each other. Because of this, theoretically, an entry can be registered in the address table 31 for each and every one of the eight instructions included in one fetch line.

However, it is rare that two consecutive instructions are both branch instructions. There is thus little need for registering both of the two consecutive instructions in the address table 31. As in the above-described example, thus, it suffices to use bit[6:3] of an instruction address as the index. Namely, the least significant bit of the index may be the bit that is next higher than the bit that varies between the instruction addresses of two consecutive instructions in one fetch line. Use of such an index configuration allows the address table 31 to cover a wider range of instruction addresses, thereby enabling efficient branch prediction.

Figure 5:
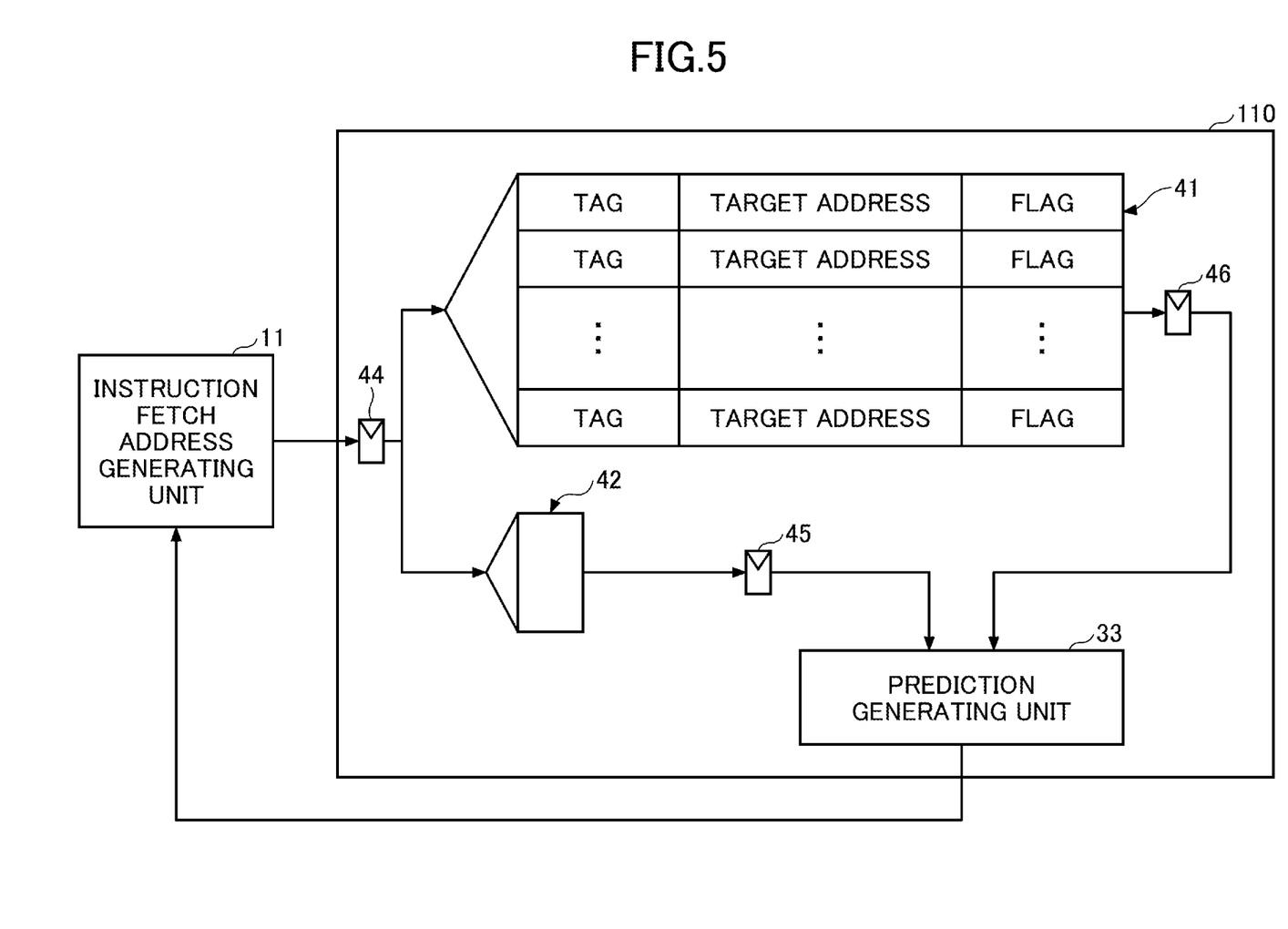
FIG. 5 is a drawing illustrating an example of the configuration of a branch predictor used in a second embodiment.

FIG. 5 is a drawing illustrating an example of the configuration of a branch predictor used in a second embodiment. The second embodiment uses a second predictor 110 illustrated in FIG. 5 in addition to the branch prediction mechanism 10 of the first embodiment illustrated in FIG. 2 (which may hereinafter be referred to as a first predictor).

The second predictor 110 performs branch prediction calculation that is more complex than that of the branch prediction mechanism 10, thereby performing branch prediction having a longer latency than that of the branch prediction mechanism 10. The second predictor 110 performs, for example, branch prediction having a three-cycle latency (over three operating clock cycles). The second predictor 110, which is not limited to a particular configuration, includes, in the example illustrated in FIG. 5, an address table 41, a bimodal predictor 42, a prediction generating unit 43, flip-flops 44, flip-flops 45, and flip-flops 46.

The instruction fetch address generating unit 11 illustrated in FIG. 5 is the same as the instruction fetch address generating unit 11 illustrated in FIG. 1, and successively generates fetch addresses such that one fetch line includes a plurality of instructions as was previously described. As in the first embodiment, the following description uses an example in which the length of a fetch line is 32 bytes, and includes eight instructions each four bytes long. It may be noted that this example is in no way intended to be limiting.

The address table 41 has a plurality of tags for each of the plurality of indexes, each of which is a bit string that is longer than, and situated at higher bit positions than, the index of the address table 31, among the plurality of bits constituting a fetch address. Here, the phrase "a bit string . . . situated at higher bit positions than" means that the least significant bit of the bit string serving as the index of the address table 41 is at a higher bit position than the least significant bit of the index of the address table 31.

The instruction fetch address generating unit 11 supplies bit[13:5] of a fetch address to the address table 41 via the flip-flops 44, for example. The address table 41 has stored therein 512 entries corresponding to 512 indexes, each of which has a length of 9 bits corresponding to bit[13:5] of a fetch address. One entry may be associated with 8 tags, for example. Namely, the address table 41 may have an 8-way, 512-entry configuration.

Each tag is a bit string situated at higher bit positions in a fetch address than the bit string of the index of the address table 41. In this example, bit[31:14], which are higher-order bits than the index bit[13:5], may be used as the tag, for example. A branch destination address and a flag indicative of whether or not the branch destination address is valid are stored in the address table 41 for each of the tags.

The address table 41 outputs the branch destination addresses and the flags corresponding to a fetch address generated by the instruction fetch address generating unit 11. Specifically, as bit[13:5] of the fetch address is supplied as the index to the address table 41, the address table 41 outputs eight tags, eight target addresses, and eight flags corresponding to this index. The eight tags, the eight target addresses, and the eight flags output from the address table 41 are stored in the flip-flops 46.

The bimodal predictor 42 may be provided with 512 saturation counters corresponding to the 512 respective indexes, each of which has a length of 9 bits corresponding to bit[13:5] of a fetch address. The bimodal predictor 42 outputs the saturation counter value corresponding to a fetch address generated by the instruction fetch address generating unit 11. Specifically, as bit[13:5] of the fetch address is supplied as the index to the bimodal predictor 42, the bimodal predictor 42 outputs the saturation counter value corresponding to this index. The saturation counter value output from the bimodal predictor 42 is stored in the flip-flops 45.

The saturation counter is, for example, a 2-bit counter. The value of the saturation counter is "00" to indicate strong "branching not taken", "01" to indicate weak "branch not taken", "10" to indicate weak "branch taken", and "11" to indicate strong "branch taken". When the saturation counter value is "00" or "01", it is determined that the branch is not taken. When the saturation counter value is "10" or "11", it is determined that the branch is taken. The saturation counter value is increased by one when the result of actual calculation of a corresponding branch instruction is "branch taken", and is decreased by one when the result of actual calculation of the corresponding branch instruction is "branch not taken". The value does not increase above the upper limit "11" and does not decrease below the lower limit "00". The bimodal predictor 42 uses, as a principle of branch prediction, the fact that a branch is likely to be taken this time after the branch has continuously been taken, and is likely to be not taken this time after the branch has continuously been "not taken".

In the following, the functioning of the second predictor 110 illustrated in FIG. 5 will be described for each operating clock cycle. In the first operating clock cycle, a fetch address from the instruction fetch address generating unit 11 is stored in the flip-flops 44. In the second cycle, data read out from the address table 41 is stored in the flip-flops 44, and a saturation counter value retrieved from the bimodal predictor 42 is stored in the flip-flops 45. In the third cycle, the prediction generating unit 43 performs branch prediction based on the saturation counter value stored in the flip flops 45 and the data stored in the flip flops 46.

Specifically, the prediction generating unit 43 compares the relevant portion of the fetch address with the tag among the eight tags for which the corresponding flag indicates valid, thereby determining whether there is a match (i.e., whether a hit occurs). The prediction generating unit 43 provides the instruction fetch address generating unit 11 with the target address corresponding to the way for which a tag match has occurred when the corresponding saturation counter value indicates "branch taken". Namely, the second predictor 110 predicts "branch taken" as the outcome of branch prediction calculation, followed by supplying the target address to the instruction fetch address generating unit 11. When the saturation counter value indicates "branch not taken", or when a tag match does not occur in any of the ways, the second predictor 110 predicts "branch not taken". If a tag match occurs in two or more ways, one ways is selected such that the selected way corresponds to an instruction address appearing first, after the fetch address, in the sequence of instruction addresses corresponding to the matched ways arranged in the sequential direction.

Figure 6:
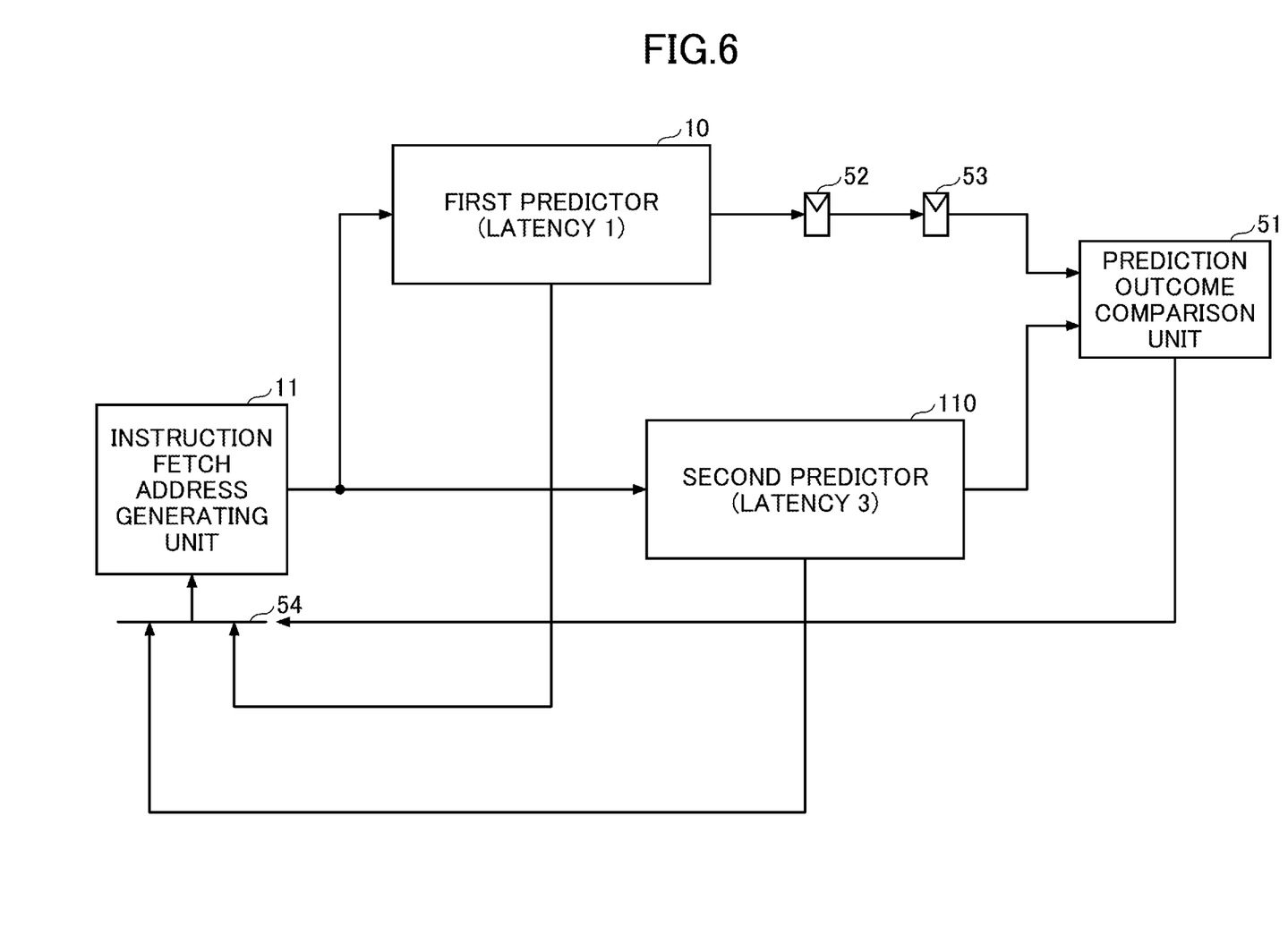
FIG. 6 is a drawing illustrating an example of the configuration of a branch prediction mechanism according to the second embodiment.

FIG. 6 is a drawing illustrating an example of the configuration of a branch prediction mechanism according to the second embodiment. In the branch prediction mechanism of the second embodiment, the first predictor 10 illustrated in FIG. 2 and the second predictor 110 illustrated in FIG. 5 are used as illustrated in FIG. 6. The outcome of branch prediction obtained by the first predictor 10 is corrected based on the outcome of branch prediction obtained by the second predictor 110, thereby performing more accurate branch prediction.

A fetch address is supplied to the first predictor 10 and to the second predictor 110 from the instruction fetch address generating unit 11 in the first operating clock cycle. In response, the first predictor 10 produces a prediction outcome within a one-cycle latency. The prediction outcome generated by the first predictor 10 is supplied to the instruction fetch address generating unit 11 via a selector 54. With this arrangement, the instruction fetch address generating unit 11 receives the prediction outcome by the first predictor 10 within a one-cycle latency, and uses it to generate a next fetch address. The selector 54 selects a prediction outcome by the second predictor 110 when a selection control signal received from the prediction outcome comparison unit 51 is 0, for example, and selects a prediction outcome by the first predictor 10 when the selection control signal is 1, for example. The selection control signal is set by default to the value (e.g., 1) that selects the prediction outcome by the first predictor 10.

In the second operating clock cycle, the data indicative of the prediction outcome by the first predictor 10 is stored in the flip-flops 52. In third operating clock cycle, the data indicative of the prediction outcome by the first predictor 10 is stored in the flip-flops 53, and is supplied to the prediction outcome comparison unit 51. In this third cycle, also, the second predictor 110 generates a prediction outcome with a three-clock latency, and this prediction outcome is supplied to the prediction outcome comparison unit 51. The prediction outcome comparison unit 51 compares the prediction outcome obtained by the first predictor 10 with the prediction outcome obtained by the second predictor 110, and sets the value of the selection control signal to 1 for provision to the selector 54 when these outcomes match. When the two outcomes do not match, the prediction outcome comparison unit 51 sets the value of the selection control signal to 0 for provision to the selector 54.

As described above, the fact that the prediction outcome by the first predictor 10 coincides with the prediction outcome by the second predictor 110 means that the prediction outcome by the first predictor 10 is confirmed. so that the fetch address issued based on the prediction outcome by the first predictor 10 is maintained as it is. Conversely, the fact that the prediction outcome by the first predictor 10 does not coincide with the prediction outcome by the second predictor 110 means that the prediction outcome by the first predictor 10 is disallowed. In this case, the fetch address that has already been issued based on the prediction outcome by the first predictor 10 is canceled, and a new fetch address is issued based on the prediction outcome by the second predictor 110.

In the second embodiment illustrated in FIG. 6, the instruction fetch address generating unit 11 generates a fetch address in response to the first branch prediction made by the first predictor 10, and, thereafter, the second branch prediction is made by the second predictor 110. When the second branch prediction is different from the first branch prediction, the instruction fetch address generating unit 11 generates a new fetch address based on the second branch prediction. This arrangement enables an efficient instruction fetch with a short latency (e.g., one-cycle latency) by use of the first predictor 10, and also enables a reliable instruction fetch with a long latency (e.g., three-clock latency) by use of the second predictor 110. That is, an efficient instruction fetch is achieved in a situation where the first predictor 10 correctly predicts branch outcomes, while reliable branch prediction is achieved by the second predictor 110, although efficiency drops, in a situation where the first predictor 10 fails to correctly predict branch outcomes.

For example, the situation may be such that the first predictor 10 predicts "branch not taken" in each of the first to third cycles, and the second predictor 110 also predicts "branch not taken" in each of the first to third cycles. In this case, the instruction fetch address generating unit 11 generates a fetch address in the sequential direction in each of the second and third cycles. In the third cycle, the first predictor 10 notifies the instruction fetch address generating unit 11 of the prediction outcome for the fetch address of the third cycle. As a result, the instruction fetch address generating unit 11 generates a fetch address in the sequential direction also in the fourth cycle.

For example, the situation may be such that the first predictor 10 predicts "branch not taken" in each of the first to third cycles, and the second predictor 110 predicts "branch not taken" in the first cycle, "branch not taken" in the second cycle, and "branch taken" in the third cycle. In this case, the instruction fetch address generating unit 11 generates a fetch address in the sequential direction in each of the second and third cycles. In the third cycle, the second predictor 110 notifies the instruction fetch address generating unit 11 of the prediction outcome for the fetch address of the first cycle. As a result, the prediction outcome by the first predictor 10 is corrected by the prediction outcome by the second predictor 110, and the instruction fetch address generating unit 11 generates the target address as the fetch address in the fourth cycle.

For example, the situation may be such that the first predictor 10 predicts "branch taken" in the first cycle, "branch not taken" in the second cycle, and "branch not taken" in the third cycle, and the second predictor 110 predicts "branch not taken" in the first cycle, "branch not taken" in the second cycle, and "branch taken" in the third cycle. Namely, both the first predictor 10 and the second predictor 110 predict "branch taken" for the fetch address of the first cycle. The instruction fetch sequence in this case is illustrated as an example in FIG. 7.

Figure 7:
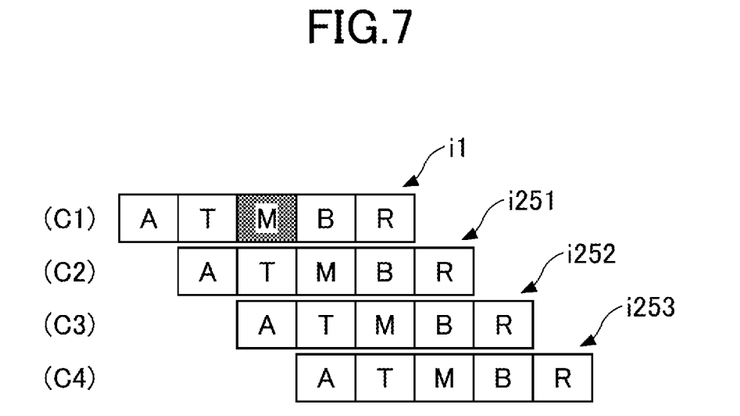
FIG. 7 is a drawing illustrating an example of instruction fetches by the branch prediction mechanism according to the second embodiment.

FIG. 7 is a drawing illustrating an example of instruction fetches by the branch prediction mechanism according to the second embodiment. FIG. 7 illustrates branch prediction operations performed for respective fetch addresses in a pipeline manner. The operations at each stage of the pipeline are as follows.

A: determine an instruction fetch address and supply the address to the branch prediction mechanism T: retrieve data from the address table and perform calculation for the instruction subject to prediction M: branch prediction B: transfer the outcome of branch prediction R: perform operations for subsequent instructions subject to branch prediction It may be noted that the above-described stages correspond to the operations of the branch prediction mechanism having a three-cycle latency. The second predictor 110 in the example of the second embodiment may perform branch prediction operations as shown in the above-described pipeline.

In the first operating clock cycle C1, a fetch address i1 is issued to perform instruction fetch, and branch prediction for the fetch address i1 is started. Operations of the five stages A to R for the fetch address i1 are performed sequentially in the respective five cycles. In the example illustrated in FIG. 7, the situation under consideration is such that the first predictor 10 produces a "branch taken" prediction outcome in the first cycle C1, and the target address indicative of the branch destination is i251. In the second cycle C2, a fetch address i251 is issued to perform instruction fetch, and branch prediction for the fetch address i251 is started.

In the third cycle C3, a fetch address i252 following the fetch address i251 in the sequential direction is issued to perform instruction fetch, and branch prediction for the fetch address i252 is started. In the third cycle C3, the outcome of branch prediction for the fetch address i1 of the first cycle is obtained in the stage M (the stage illustrated in dot shading in FIG. 7).

In this example, the situation under consideration is such that the second predictor 110 predicts "branch taken" in the third cycle, thereby confirming the "branch taken" prediction made by the first predictor 10 in the first cycle. Therefore, the fetch address i251 of the second cycle C2 and the fetch address i252 of the third cycle C3 that have already been issued are retained as they are. In the fourth cycle C4, a fetch address i253 following the fetch address i252 in the sequential direction is issued to perform instruction fetch.

Figure 8:
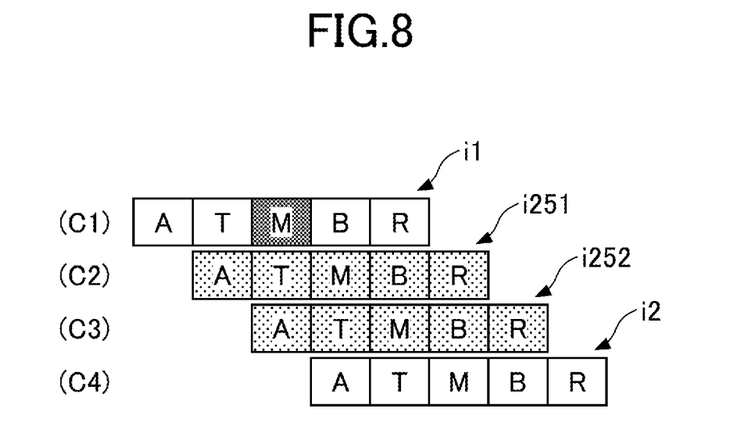
FIG. 8 is a drawing illustrating an example of instruction fetches by the branch prediction mechanism according to the second embodiment.

FIG. 8 is a drawing illustrating another example of instruction fetches by the branch prediction mechanism according to the second embodiment. FIG. 8 illustrates a situation in which the first predictor 10 predicts "branch taken" in the first cycle, "branch not taken" in the second cycle, and "branch not taken" in the third cycle, and the second predictor 110 predicts "branch not taken" in the first cycle, "branch not taken" in the second cycle, and "branch not taken" in the third cycle. Namely. with respect to branch prediction for the fetch address of the first cycle, the first predictor 10 produces a "branch taken" prediction outcome, and the second predictor 110 produces a "branch not taken" prediction outcome.

In the first operating clock cycle C1, a fetch address i1 is issued to perform instruction fetch, and branch prediction for the fetch address it is started. In the example illustrated in FIG. 8, the situation under consideration is such that the first predictor 10 produces a "branch taken" prediction outcome in the first cycle C1, and the target address indicative of the branch destination is i251. In the second cycle C2, a fetch address i251 is issued to perform instruction fetch, and branch prediction for the fetch address i251 is started.

In the third cycle C3, a fetch address i252 following the fetch address i251 in the sequential direction is issued to perform instruction fetch, and branch prediction for the fetch address i252 is started. In this third cycle C3, the outcome of branch prediction for the fetch address i1 of the first cycle is obtained in the stage M.

In this example, the situation under consideration is such that the second predictor 110 predicts "branch not taken" in the third cycle, thereby rejecting the "branch taken" prediction made by the first predictor 10 in the first cycle. Therefore, the fetch address i251 of the second cycle C2 and the fetch address i252 of the third cycle C3 that have already been issued are canceled, and the instruction execution sequence that was speculatively performed is canceled. In the fourth cycle C4, a fetch address i2 following the fetch address i1 of the first cycle C1 in the sequential direction is issued to perform instruction fetch.

Figure 9:
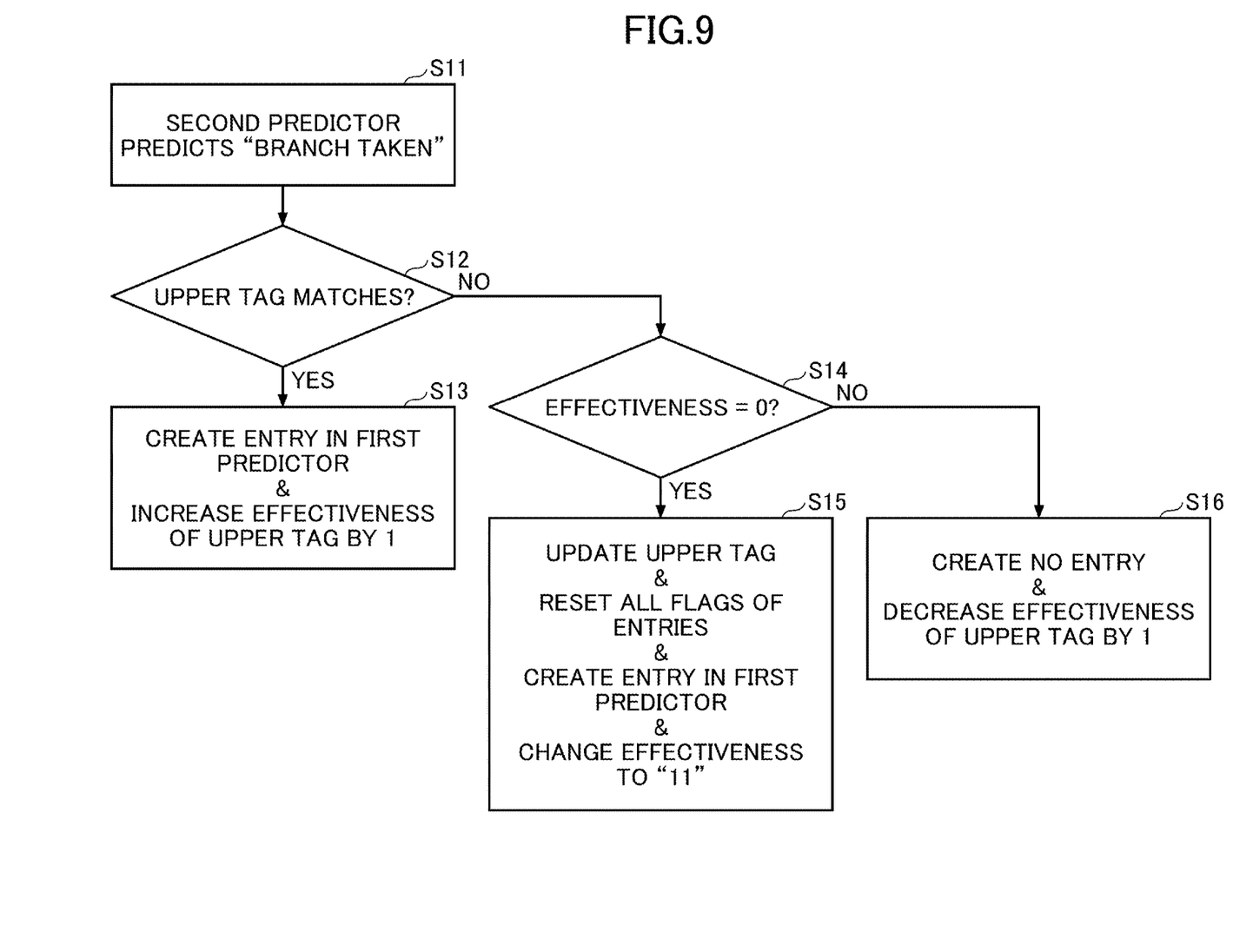
FIG. 9 is a drawing illustrating an example of an entry update process with respect to a first predictor.

FIG. 9 is a drawing illustrating an example of an entry update process with respect to the first predictor. In the first embodiment in which only the first predictor 10 is used as the branch prediction mechanism, information from the RSBR 18 may be used to register and reset an entry in the address table 31 and to update the upper tag storage unit 32 as previously described. Since the first predictor 10 and the second predictor 110 are used in the second embodiment, the prediction outcome by the second predictor 110 may be used to perform registration, updating, and resetting of the first predictor 10.

Upon the occurrence of the event that the second predictor 110 predicts "branch taken" (step S11), the process in step S12 is performed. In step S12, the first predictor 10 determines whether the upper tag (the second tag stored in the upper tag storage unit 32) coincides with the upper portion of the instruction address for which the second predictor 110 has predicted "branch taken". If they match, the procedure goes to step S13.

In step S13, the first predictor 10 creates an entry for the instruction for which "branch taken" is predicted, in the address table 31 at the index position indicated by the corresponding fetch address. Specifically, the first predictor 10 stores bit [10:7] of the corresponding fetch address as a first tag at the noted index position, together with the predicted target address, and sets the flag indicative of valid. The first predictor 10 also increases the effectiveness (i.e., saturation counter value) of the upper tag storage unit 32 by one.

Upon determining that no match occurs with respect to the upper tag in step S12, the procedure proceeds to step S14. In S14, the first predictor 10 determines whether the effectiveness (i.e., saturation counter value) of the upper tag storage unit 32 is 0. In this example, the saturation counter is 2 bits long, with an upper limit of 3 (=11) and a lower limit of 0 (=00). If the effectiveness is 0, the procedure goes to step S15.

In step S15, the first predictor 10 updates the upper tag by storing the higher-order bits of the corresponding fetch address (e.g., bit[15:11]) as a second tag in the upper tag storage unit 32. The first predictor 10 further resets all the flags in the address table 31, and creates an entry for the instruction for which "branch taken" is predicted, in the address table 31 at the index position indicated by the corresponding fetch address. Specifically, the first predictor 10 stores bit[10:7] of the corresponding fetch address as a first tag at the noted index position, together with the predicted target address, and sets the flag indicative of valid. The first predictor 10 also changes the effectiveness (i.e., saturation counter value) of the upper tag storage unit 32 to the upper value "3" (=11).

Upon determining that the effectiveness is not zero in step S14, the procedure proceeds to step S16. In step S16, the first predictor 10 decreases the effectiveness (i.e., saturation counter value) stored in the upper tag storage unit 32 by one without creating a new entry.

Figure 10:
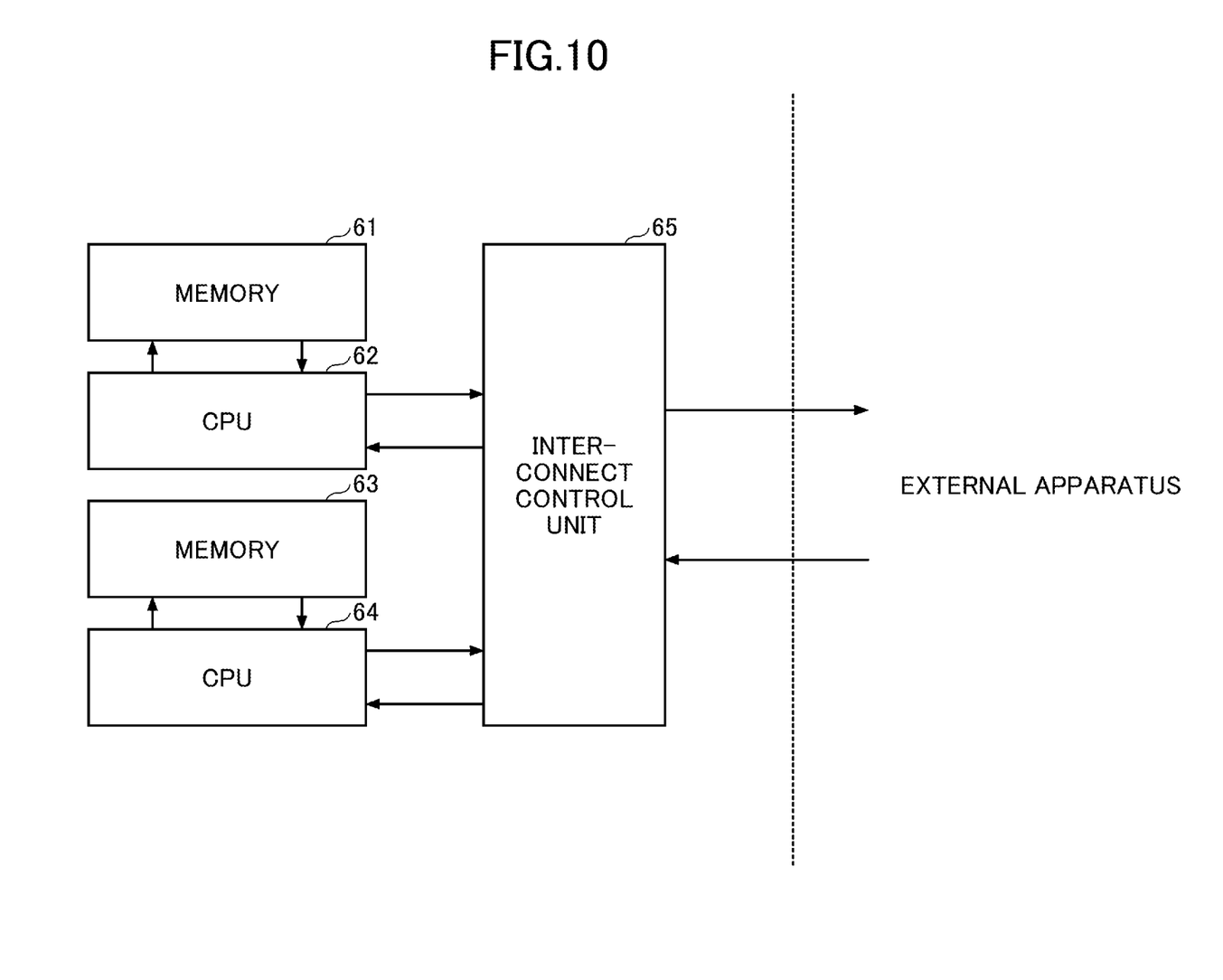
FIG. 10 is a drawing illustrating an example of a system configuration using a processor that is provided with the branch prediction mechanism.

FIG. 10 is a drawing illustrating an example of a system configuration using a processor that is provided with the branch prediction mechanism. The system illustrated in FIG. 10 includes a memory 61, a CPU (central processing unit) 62, a memory 63, a CPU 64, and an interconnect controller 65. The CPUs 62 and 64 have a processor configuration as illustrated in FIG. 1, for example, and incorporate the branch prediction mechanism according to the first or second embodiment described above. The interconnect controller 65 performs input/output control for an external device. In a system such as a server device including a plurality of processors and memories as illustrated in FIG. 10, the branch prediction mechanism described above can be used.

According to at least one embodiment, an arithmetic processing apparatus that performs branch prediction with short latency is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An arithmetic processing circuit, comprising:
an instruction fetch address generating unit configured to generate fetch addresses successively such that a plurality of instructions are included in one fetch line;
an address table configured to store a branch destination address and a first tag for each of a plurality of indexes, the indexes being defined as a first bit string that is extracted from a fetch address by including at least one bit among instruction address bits whose values vary within the one fetch line, the first tag being a second bit string situated at higher bit positions than the first bit string in the fetch address;
an upper tag storage unit configured to store a second tag, which is a third bit string situated at higher bit positions than the first tag among a plurality of bits constituting the fetch address; and
a branch direction determination unit configured to supply to the instruction fetch address generating unit the branch destination address retrieved from the address table in response to the fetch address, upon determining that the first tag retrieved from the address table in response to the fetch address and the second tag stored in the upper tag storage unit match respective portions of the fetch address.

2. The arithmetic processing circuit as claimed in claim 1, wherein the instruction fetch address generating unit successively generate the fetch addresses in synchronization with a clock signal, and
wherein, upon occurrence of an event that the branch direction determination unit supplies to the instruction fetch address generating unit a first branch destination address in response to a first fetch address generated in a first clock cycle of the clock signal, the instruction fetch address generating unit generates the first branch destination address as a fetch address in a second clock cycle following the first clock cycle.

3. The arithmetic processing circuit as claimed in claim 1, wherein a least significant bit of each of the indexes is a bit that is next higher than a bit that varies between instruction addresses of two consecutive instructions among the plurality of instructions included in the one fetch line.

4. The arithmetic processing circuit as claimed in claim 1, wherein each of the indexes is 4 bits long.

5. The arithmetic processing circuit as claimed in claim 1, further comprising a predictor configured to perform branch prediction based on an address table that has a plurality of tags for each index, the index being a bit string that is longer than, and situated at higher bit positions than, the indexes, among the plurality of bits constituting the fetch address,
wherein upon occurrence of an event that the instruction fetch address generating unit generates a fetch address in response to a first branch prediction made by the branch direction determining unit, and thereafter the predictor makes a second branch prediction different from the first branch prediction, the instruction fetch address generating unit generates a new fetch address based on the second branch prediction.

6. An arithmetic processing method comprising:
generating fetch addresses successively such that a plurality of instructions are included in one fetch line;
retrieving a first tag and a branch destination address in response to a fetch address from an address table configured to store a branch destination address and a first tag for each of a plurality of indexes, the indexes being defined as a first bit string that is extracted from a fetch address by including at least one bit among instruction address bits whose values vary within the one fetch line, the first tag being a second bit string situated at higher bit positions than the first bit string in the fetch address; and
using as the fetch address the branch destination address retrieved from the address table in response to the fetch address upon occurrence of an event that a second tag that is a bit string at higher bit positions than the first tag among a plurality of bits constituting the fetch address and the first tag retrieved from the address table in response to the fetch address match respective portions of the fetch address.

* * * * *